US010981775B2

(12) United States Patent
Preissler

(10) Patent No.: US 10,981,775 B2
(45) Date of Patent: Apr. 20, 2021

(54) APPARATUS FOR FILLING VEHICLES ON ASSEMBLY LINES IN THE AUTOMOBILE INDUSTRY

(71) Applicant: DÜRR SOMAC GMBH, Stollberg (DE)

(72) Inventor: Bernd Preissler, Mühlau (DE)

(73) Assignee: DÜRR SOMAC GmbH, Stollberg (DE)

( * ) Notice: Subject to any disclaimer, the term of this patent is extended or adjusted under 35 U.S.C. 154(b) by 0 days.

(21) Appl. No.: 16/489,398

(22) PCT Filed: Mar. 22, 2018

(86) PCT No.: PCT/DE2018/000073
§ 371 (c)(1),
(2) Date: Aug. 28, 2019

(87) PCT Pub. No.: WO2018/177450
PCT Pub. Date: Oct. 4, 2018

(65) Prior Publication Data
US 2020/0115217 A1 Apr. 16, 2020

(30) Foreign Application Priority Data
Mar. 28, 2017 (DE) .................. 20 2017 001 707.5

(51) Int. Cl.
*B67D 7/42* (2010.01)
*B67D 7/02* (2010.01)
*B67D 7/04* (2010.01)

(52) U.S. Cl.
CPC .......... *B67D 7/428* (2013.01); *B67D 7/0288* (2013.01); *B67D 7/0401* (2013.01);
(Continued)

(58) Field of Classification Search
CPC .... B67D 7/428; B67D 7/0288; B67D 7/0401; B67D 2007/0419; B67D 2007/0426;
(Continued)

(56) References Cited

U.S. PATENT DOCUMENTS 2,966,248 A * 12/1960 Armbruster ............. G07F 17/00
194/242
4,708,175 A * 11/1987 Janashak ............... B25J 15/0019
141/1
(Continued)

FOREIGN PATENT DOCUMENTS

DE 29921068 U1 1/2000
DE 102016208534 A1 12/2016
(Continued)

OTHER PUBLICATIONS

International Search Report (in English and German) and Written Opinion (in German) issued in PCT/DE2018/000073, dated Sep. 5, 2018; ISA/EP.

*Primary Examiner* — Jason K Niesz
(74) *Attorney, Agent, or Firm* — Harness, Dickey & Pierce, P.L.C.

(57) ABSTRACT

A device for filling vehicles on assembly lines with a plurality of different operating media, which are fed from filling stations via connecting lines and special adapters into the circuits and tanks of the vehicles. The device structurally integrates the terminals of all tanks and circuits of a vehicle which are to be filled with an operating medium in a common assembly, configured as a filling unit installed in the vehicle. The filling unit can be brought into operative connection with a filling tool for all of the terminals of all filling stations of different operating media. The terminals for the same operating medium at the filling unit of the vehicle and the filling tool to be brought into operative connection are configured with congruent contours.

5 Claims, 4 Drawing Sheets

(52) U.S. Cl.
CPC .......... *B67D 2007/043* (2013.01); *B67D 2007/0419* (2013.01); *B67D 2007/0426* (2013.01); *B67D 2210/0006* (2013.01)

(58) Field of Classification Search
CPC ...... B67D 2007/043; B67D 2210/0006; B67D 7/06; B67D 7/344; B67D 7/02; B67D 7/42; F25B 45/00; F25B 2345/001; B60H 1/00585

See application file for complete search history.

(56) References Cited

U.S. PATENT DOCUMENTS

| | | | |
|---|---|---|---|
| 4,804,208 | A | 2/1989 | Dye |
| 7,082,969 | B1 | 8/2006 | Hollerback |
| 9,957,152 | B2 | 5/2018 | Zammit et al. |
| 2002/0096879 | A1 | 7/2002 | Liao |
| 2003/0164200 | A1 | 9/2003 | Czeranna et al. |
| 2016/0347603 | A1 | 12/2016 | Zammit et al. |
| 2018/0208452 | A1 | 7/2018 | Zammit et al. |

FOREIGN PATENT DOCUMENTS

| | | |
|---|---|---|
| EP | 2818596 A2 | 12/2014 |
| JP | H04128188 A | 4/1992 |

\* cited by examiner

APPARATUS FOR FILLING VEHICLES ON ASSEMBLY LINES IN THE AUTOMOBILE INDUSTRY

CROSS-REFERENCE TO RELATED APPLICATIONS

This application is a 371 U.S. National Phase of International Application No. PCT/DE2018/000073, filed on Mar. 22, 2018, which claims the benefit of German Patent Application No. 20 2017 001 707.5, filed on Mar. 28, 2017. The entire disclosures of the above applications are incorporated herein by reference.

FIELD

The invention relates to a device for the filling of vehicles on assembly lines in the automobile industry where vehicles can be filled with a plurality of different operating media, which are fed from filling stations via connecting lines and special adapters into the circuits and tanks of the vehicles.

BACKGROUND

This section provides background information related to the present disclosure which is not necessarily prior art.

In the automobile industry, in the manufacturing process on the assembly lines, the filling of housings, circuits, reservoirs and similar assemblies of vehicles with different types of supplies is necessary. The media (fuel, brake fluid, hydraulic oil, coolant, refrigerant, windscreen cleaner, substances for exhaust gas purification, etc.) are fed from filling stations via connecting lines and special adapters into the circuits and tanks of the vehicles in mostly automated processes. The adapters are equipped with modules for process control to open or close media lines in the various process steps.

The filling is usually carried out by workers. The workers take the media adapters to the vehicle and attach them to the respective vehicle tanks. The basic principle of such assembly lines is known e.g. from US 2003 0164 200 A1.

Due to the design-induced arrangement of the modules, the terminals to be attached are often relatively far apart from each other, so that handling a plurality of separate adapters is laborious and time-consuming for the worker. Especially in vehicles with internal combustion engines, the respective tanks as the interface of the vehicle systems to be filled are currently arranged at various locations in the engine compartment. Thus, separate adapters are required for each medium, which need to be placed onto the tanks individually and successively by the worker for filling the tank and be removed again individually upon completion of the filling. Nonetheless, this variant of filling vehicles with internal combustion engines has proven successful.

However, in alternative vehicle concepts other criteria for the filling of supplies assume priority, so that demand for new development concepts is increasing in this regard.

SUMMARY

This section provides a general summary of the disclosure, and is not a comprehensive disclosure of its full scope or all of its features.

The objective of the present invention is, therefore, to provide a technical solution which allows the filling of the supplies with reduced expenditure of both time and work compared to the known state-of-art processes. Here, the intended approach is that future vehicle concepts provide more space for technological interfaces and thus also for the vehicle filling system.

The objective is achieved by structurally integrating the terminals of all tanks and circuits of a vehicle which are to be filled with an operating medium in a common assembly, which is configured as a filling unit installed in the vehicle and which can be brought into operative connection with a filling tool structurally integrating the terminals of all filling stations of different operating media, wherein the terminals for the same operating medium at the filling unit of the vehicle and the filling tool are configured with congruent contours and wherein the top side of the vehicle's filling unit in assembly position features openings configured as interfaces for the adaptation of the filling tool. Beneficial designs are subject matter of dependent claims, whose features are described in more detail in an exemplary embodiment.

The solution according to the invention is, therefore, to apply an assembly functionally acting as filling unit, which is arranged permanently in the vehicle in a readily accessible position. The media-carrying lines of all vehicle systems to be filled are connected to this filling unit. During filling, the filling unit is brought into operative connection with a filling tool.

This technical solution is preferably suited for alternative vehicle concepts, for example for cars with an electric motor drive. Likewise, an application for conventional vehicle concepts is possible if the available space allows for the installation of such a filling unit. In addition, it cannot be used in cars only, but generally throughout the entire vehicle industry.

Provided that the filling is performed by a worker as before, the worker will benefit from the use of the filling unit with the associated filling tool through substantially reduced expenditure of time and work. The design of the filling unit also allows fully automated filling.

For this purpose, the filling tool is attached to a manually, semi-automatically or fully automatically operated handling device, e.g. to an automation device configured as a robot. With this device, the filling tool is moved to the filling unit and attached closely on top of the filling unit. Now, all systems can be simultaneously filled automatically with the required operating media. After filling, the automation device detaches the filling tool from the filling unit. The filling tool is then brought into the basic position or attached to the next vehicle to be filled.

The filling tool is preferably designed so that a tool carrier attached to a manually or semi-automatically or fully automatically operated handling device (such as a robot or a robot hand) can receive the filling tool. The tool carrier is connected to all media lines, which contain the operating media to be filled in the vehicle. The filling tool itself is located in a filling tool tray. The tray may preferably accommodate several different filling tools for different vehicle types and/or vehicle filling units. These different filling tools each have the respective vehicle interface on their bottom side and a standard interface for the tool carrier on their top side.

If on an assembly line so-called mixed model production takes place, the robot automatically takes the filling tool predetermined by the control equipment and adapts and locks this filling tool with the tool carrier. After filling of the vehicle systems, the robot together with the filling tool moves back to the basic position or attaches to the filling unit of the next vehicle to be filled. If this next vehicle to be filled, however, is a different type of vehicle and/or features another filling unit than the vehicle filled before, the filling tool attached to the robot is automatically stored in the filling tool tray and the filling tool required for the vehicle type to be filled next is picked, locked and sealed by the tool carrier attached to the robot.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Hereinafter, an embodiment will be explained with reference to the drawing. In particular:

DETAILED DESCRIPTION

Example embodiments will now be described more fully with reference to the accompanying drawings.

Figure 1:
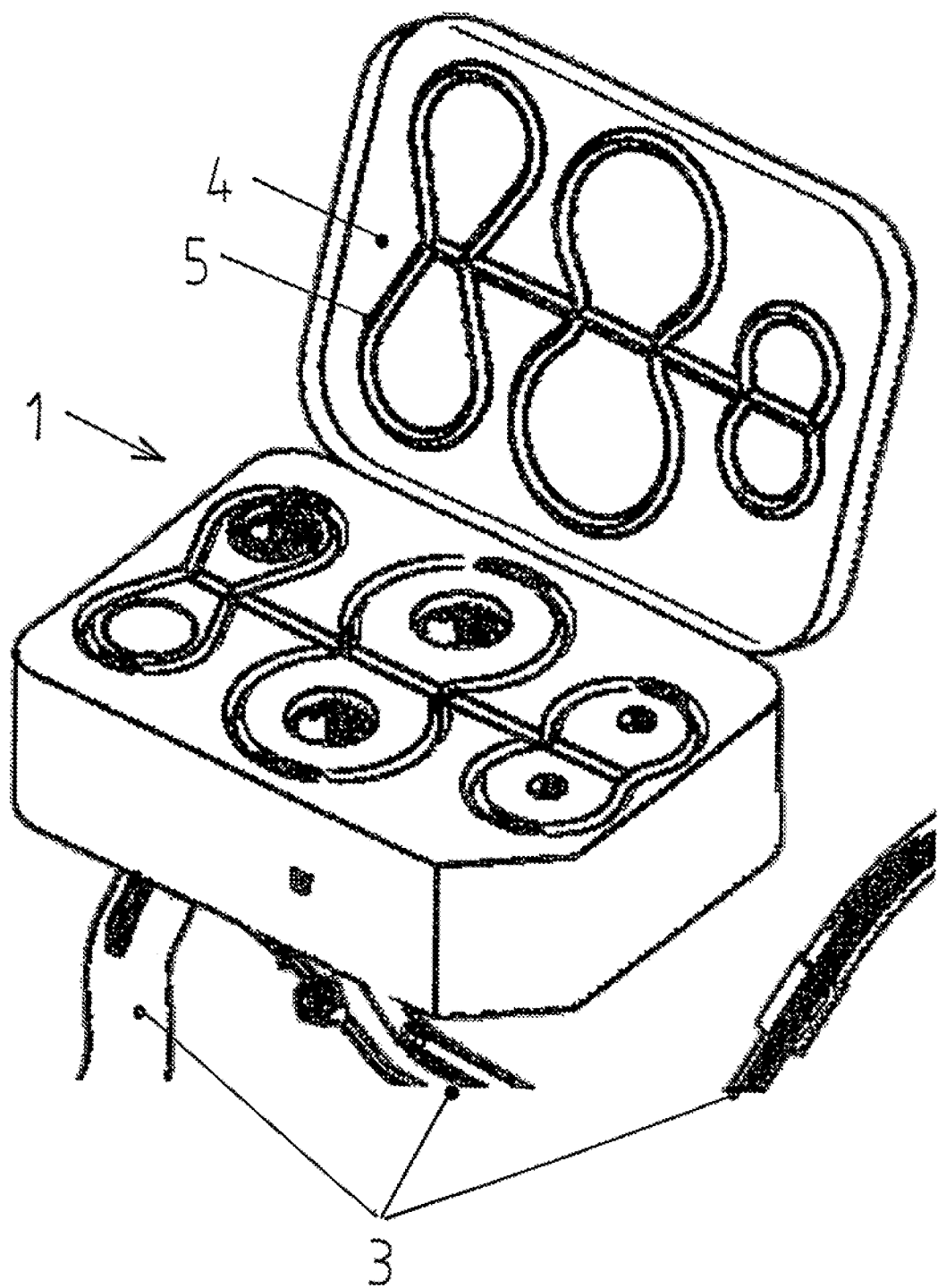
FIG. 1 shows the basic structure of a filling unit according to the invention.

The filling unit (1) shown in FIG. 1 is designed for the filling of vehicles (2) on assembly lines in the automobile industry where vehicles (2) are filled with a plurality of different operating media. These operating media (e.g. brake fluid, coolant, refrigerant, windscreen cleaner etc.) are supplied from filling stations, which are not specified here, via separate connecting lines (3) and special adapters into the circuits and tanks of the vehicles (2) to be filled. Here, the terminals of all tanks and circuits of the vehicle (2) to be filled with an operating medium are structurally integrated in a filling unit (1) installed in the vehicle (2). This filling unit (1) is preferably provided with a hinged cover (4) with sealing elements (5) so that an operationally reliable seal is ensured in case of non-filling.

Figure 2:
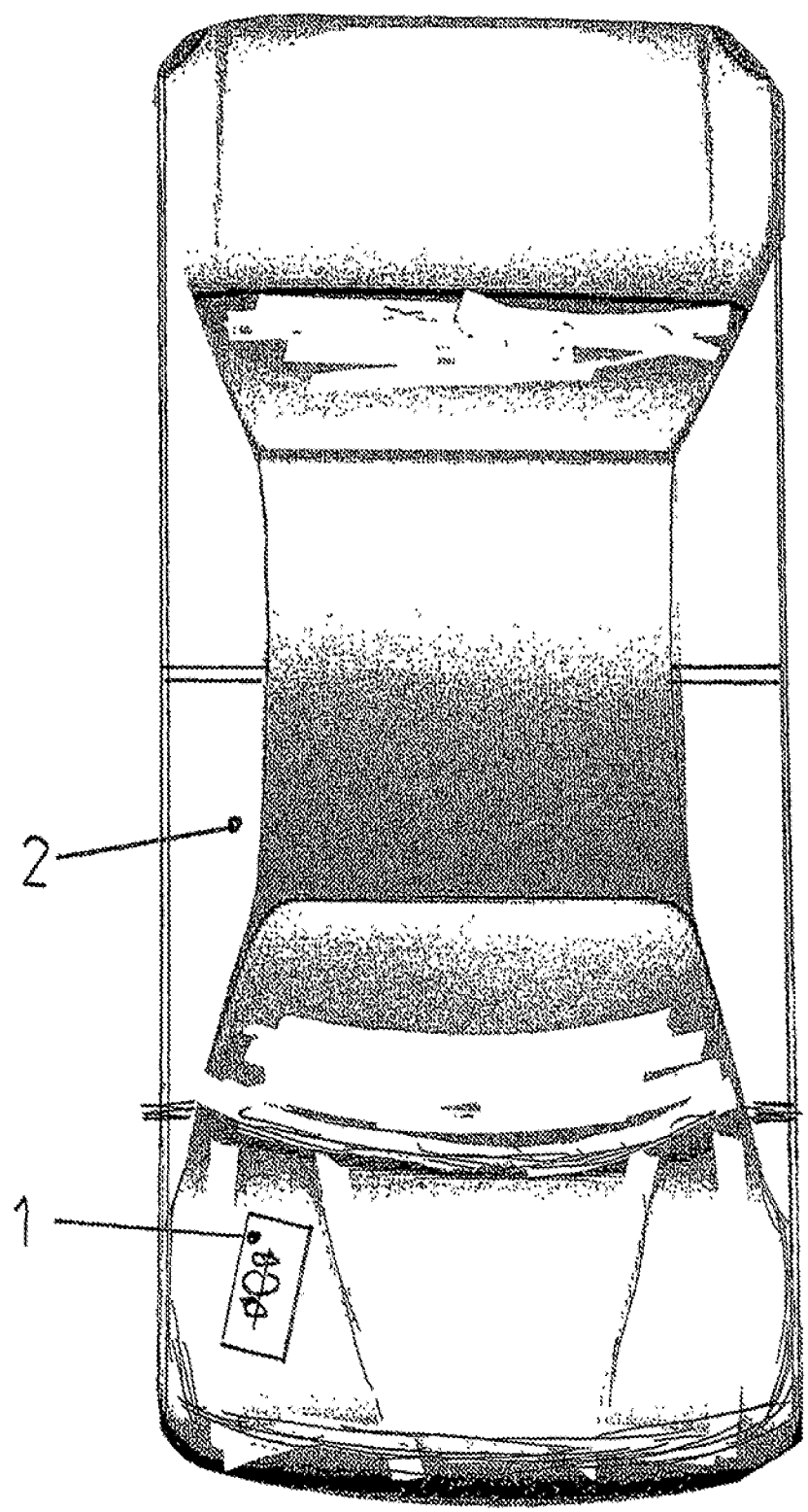
FIG. 2 shows the position of a filling unit installed in a vehicle.

FIG. 2 shows an example of a possible arrangement of a filling unit (1) in a vehicle (2) with an alternative vehicle concept. The exact arrangement of the filling unit (1) is determined primarily by the available free space. Consequently, not only arrangements in the engine compartment are possible, but also in other areas of the vehicle. In principle, the chosen arrangement is such that good accessibility for a worker or—in the preferred application with fully automated filling—for a semi-automatically or fully automatically operated handling device/robot (6) is achieved.

Figure 3:
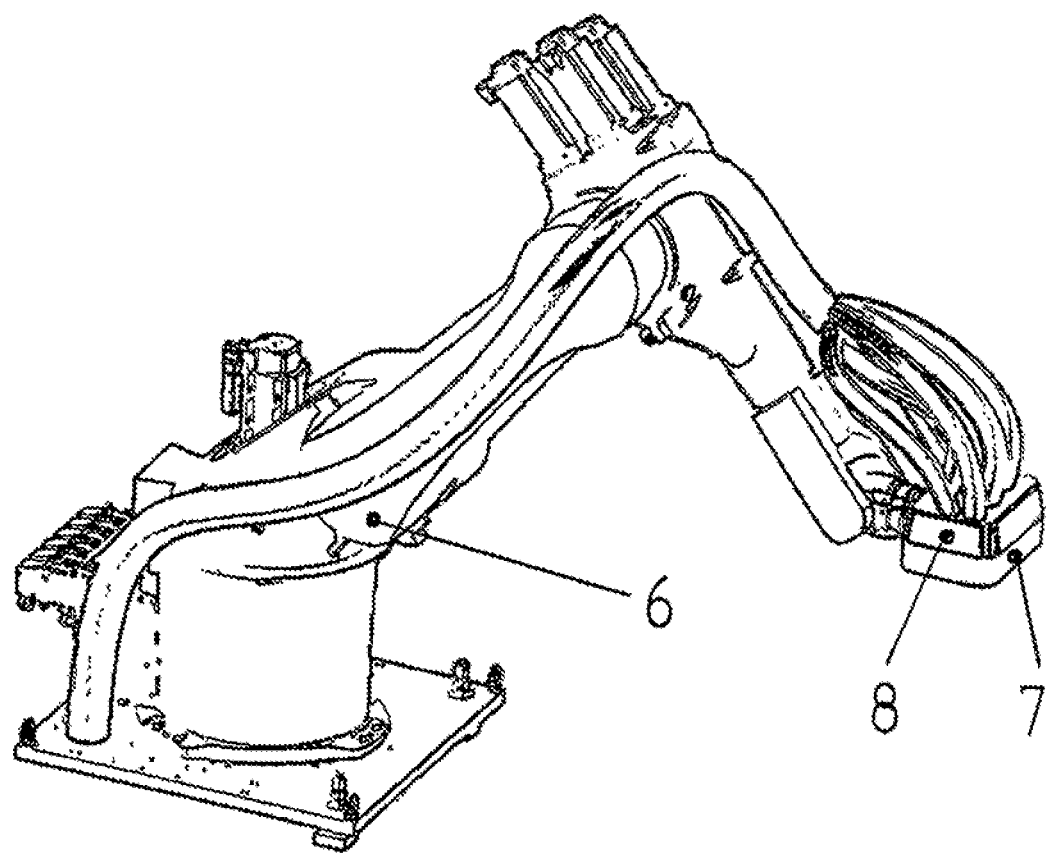
FIG. 3 shows a handling device (robot) with filling tool.

FIG. 3 shows a variant in this regard, in which a filling tool (7) is attached to a semi-automatic or fully automatic handling device/robot (6). At this filling tool (7), the terminals of all the filling stations of different operating media are structurally integrated.

Figure 4:
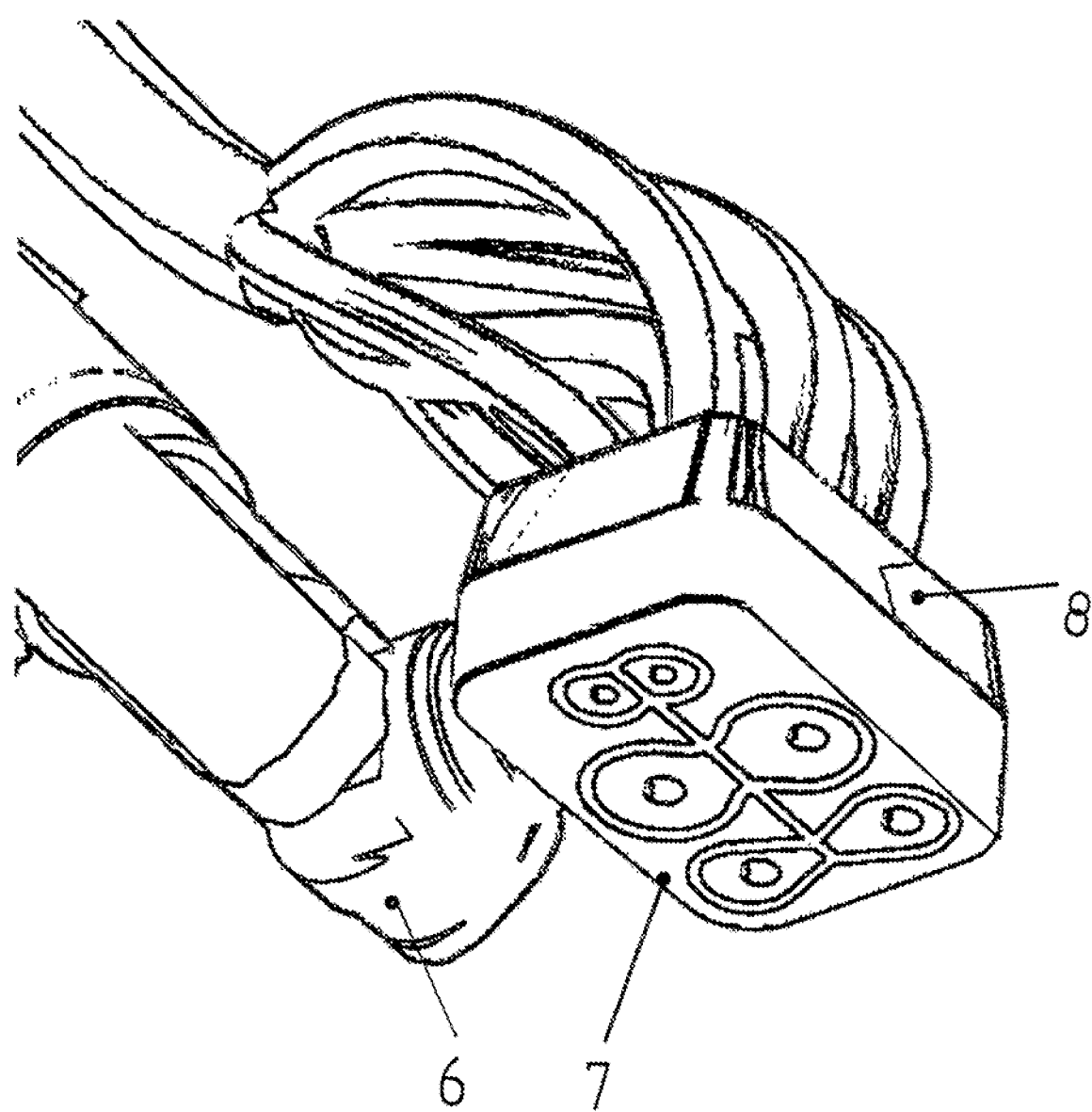
FIG. 4 is a detailed view of the filling tool guided by the robot according to FIG. 3.

During the filling process, the filling tool (7) shown in detail in FIG. 4 is brought into operative connection with the filling unit (1) installed in the vehicle (2). For this purpose, the top side of the vehicle's filling unit (1) in assembly position features openings configured as interfaces for the adaptation of the filling tool (7). The terminals for the same operating medium at the filling unit (1) and the filling tool (7) are configured with congruent contours so that a functionally reliable sealing is ensured during filling. Thus, the filling tool (7) arranged on the semi-automatically or fully automatically operated handling device/robot (6) can be automatically moved to the filling unit (1) and be attached to it.

The handling device/robot (6), which is preferably semi-automatically or fully automatically operated but can be manually operated too, preferably comprises a tool carrier (8) that receives the filling tool (7) and is connected to the media lines of all operating media to be filled into the vehicle. The tool carrier (8) is preferably designed as a semi-automatically or fully automatically operated handling device (e.g. robot or robotic hand) so that an automated operation is also possible here. It is envisaged that the filling tool (7) is attributed to a filling tool tray, which is designed to receive different filling tools (7) for different vehicles (2) or filling units (1). The filling tools (7) each feature on their top side in assembly position a standard interface for the tool carrier (8) and on their bottom side, respectively, a vehicle interface.

If the device according to the invention is used on an assembly line for the production of motor vehicles (e.g. cars with an electric motor drive), the functional sequence is as follows:

A plurality of vehicles (2), each with a filling unit (1) installed in the vehicle (2), is successively moved on an assembly line. Next to the moving assembly line, a fully automatic handling device and a filling tool tray are arranged, which can be either stationary or movable in sections parallel to the assembly line.

The handling device, designed as a robot (6) and equipped with the tool carrier (8), moves to the filling tool tray, where different filling tools (7) are stored. Next, the tool carrier (8) picks a selected filling tool (7), which is required for filling the vehicle (2) currently conveyed on the assembly line. Then, the robot (6) moves with the coupled tool carrier (8) and the actual selected filling tool (7) to the assembly line towards the vehicle (2) to be filled. Thereafter, the robot (6) attaches the filling tool (7) through the tool carrier (8) to the filling unit (1) installed in the vehicle (2). Finally, filling with all necessary operating media is performed.

The foregoing description of the embodiment has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system for filling a plurality of fluid tanks and fluid circuits of an automobile on an assembly line with a plurality of different operating media fed from a plurality of filling stations via a plurality of fluid connecting lines, the system comprising:

a filling tool carrier comprising a structurally integrated assembly including a plurality of tool carrier fluid connections which are disposed in a tool carrier-specific arrangement and which are correspondingly fluidly connected to the plurality of fluid connecting lines;

a filling unit installed in the automobile comprising a structurally integrated common assembly including a plurality of first fluid adapters which are disposed in a vehicle-specific arrangement and which are correspondingly fluidly connected to a corresponding one of the plurality of fluid tanks and fluid circuits of the automobile;

a filling tool attached between the filling tool carrier and the filling unit comprising a structurally integrated common assembly including a plurality of second fluid adapters, wherein on a tool-carrier side of the filling tool, the plurality of second fluid adapters are disposed in the tool carrier-specific arrangement, and on a filling unit side of the filling tool, the plurality of second fluid adapters are disposed in the vehicle-specific arrangement;

wherein each of the plurality of second fluid adapters is fluidly connected to a corresponding one of the plurality of tool carrier fluid connections and a corresponding one of the plurality of first fluid adapters;

wherein the system is operable to simultaneously fill all of the plurality of fluid tanks and fluid circuits of the automobile with all of the plurality of different operating media; and wherein the filling unit further comprises a cover for closing the filling unit, the cover comprising a plurality of fluid seals corresponding to the plurality of first fluid adapters, wherein each fluid seal closes a corresponding one of the plurality of fluid tanks and fluid circuits of the automobile when the cover is in place.

2. A system for filling a plurality of fluid tanks and fluid circuits of each of a plurality of automobiles on an assembly line with a corresponding plurality of different operating media from a plurality of filling stations supplied through a plurality of fluid connecting lines, the system comprising:

a filling tool carrier having a structurally integrated assembly comprising a common interface;

a plurality of interchangeable filling tools each having a structurally integrated assembly comprising a first interface, a second interface and a plurality of fluid adapters extending through the filling tool from the first interface to the second interface;

a plurality of filling units, each filling unit installed in an automobile of the plurality of automobiles and having a structurally integrated assembly comprising a vehicle interface;

wherein the first interface of each of the plurality of filling tools is configured to be attached to the common interface of the filling tool carrier and the second interface of each of the plurality of filling tools is configured to be attached to the vehicle interface of a filling unit of at least one of the plurality of automobiles;

wherein the common interface comprises a first arrangement of a plurality of tool carrier fluid connections, each of the plurality of tool carrier fluid connections comprising a fluid line end fluidly connected to a corresponding one of the plurality of fluid connecting lines and a common end opposite to the fluid line end;

wherein the vehicle interface comprises one of at least two different second arrangements of a plurality of vehicle fluid connections, each of the plurality of vehicle fluid connections being fluidly connected to a corresponding one of the plurality of fluid tanks and fluid circuits of the automobile;

wherein, at the first interface of each of the plurality of filling tools, the plurality of fluid adapters are arranged to correspond and fluidly connect to the first arrangement of the plurality of tool carrier fluid connections;

wherein, at the second interface of a first one of the plurality of filling tools, the plurality of fluid adapters are arranged to correspond and fluidly connect to a first one of the at least two second arrangements of a plurality of vehicle fluid connections;

wherein, at the second interface of a second one of the plurality of filling tools, the plurality of fluid adapters are arranged to correspond and fluidly connect to a second one of the at least two second arrangements of a plurality of vehicle fluid connections; and wherein, when a filling tool is attached to both the filling tool carrier and a filling unit of an automobile on an assembly line, all of the plurality of fluid tanks and fluid circuits of the automobile are correspondingly fluidly connected to all of the filling stations by the plurality of fluid connecting lines and the system is operable to simultaneously fill all of the plurality of fluid tanks and fluid circuits of the automobile with all of the plurality of different operating media.

3. The system according to claim 2 wherein the filling unit further comprises a cover for closing the filling unit, the cover comprising a plurality of fluid seals arranged to fluidly seal the plurality of vehicle fluid connections of the filling unit.

4. The system according to claim 3, wherein the filling tool is arranged in a manual, semi-automatic or fully automatic handling device which is operable to move the filling tool to the filling unit and attach the filling tool to the filling unit.

5. The system according to claim 4, wherein the handling device comprises a robot equipped with the filling tool carrier and configured to receive the filling tool and to carry all of the plurality of fluid connecting lines.

* * * * *

UNITED STATES PATENT AND TRADEMARK OFFICE
CERTIFICATE OF CORRECTION

PATENT NO. : 10,981,775 B2
APPLICATION NO. : 16/489398
DATED : April 20, 2021
INVENTOR(S) : Bernd Preissler Page 1 of 1

It is certified that error appears in the above-identified patent and that said Letters Patent is hereby corrected as shown below:

In the Claims

Column 5,
Claim 1, Line 3, after "connected to", delete "a corresponding one of"

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*